Sept. 15, 1970     W. McNENNEY     3,528,595
STRIP GUIDE FOR BUILDING PNEUMATIC TIRES
Filed Nov. 25, 1968     4 Sheets-Sheet 1
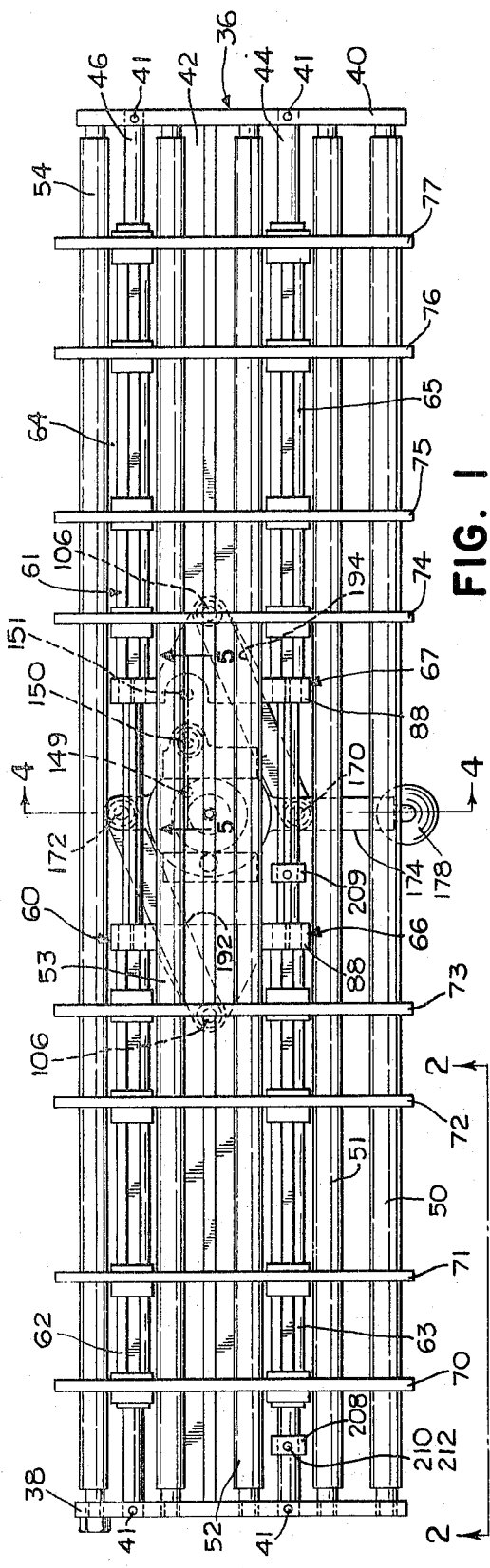
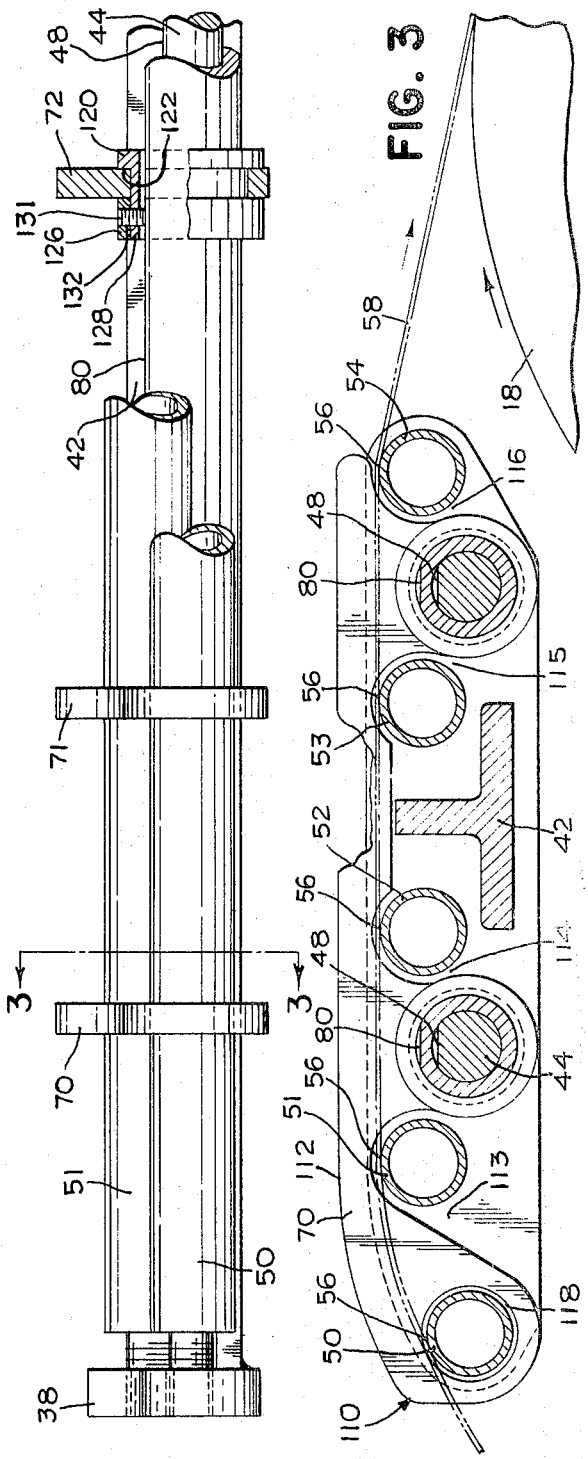
INVENTOR.
WILLIAM McNENNEY
BY M. William Goodwin
ATTORNEY

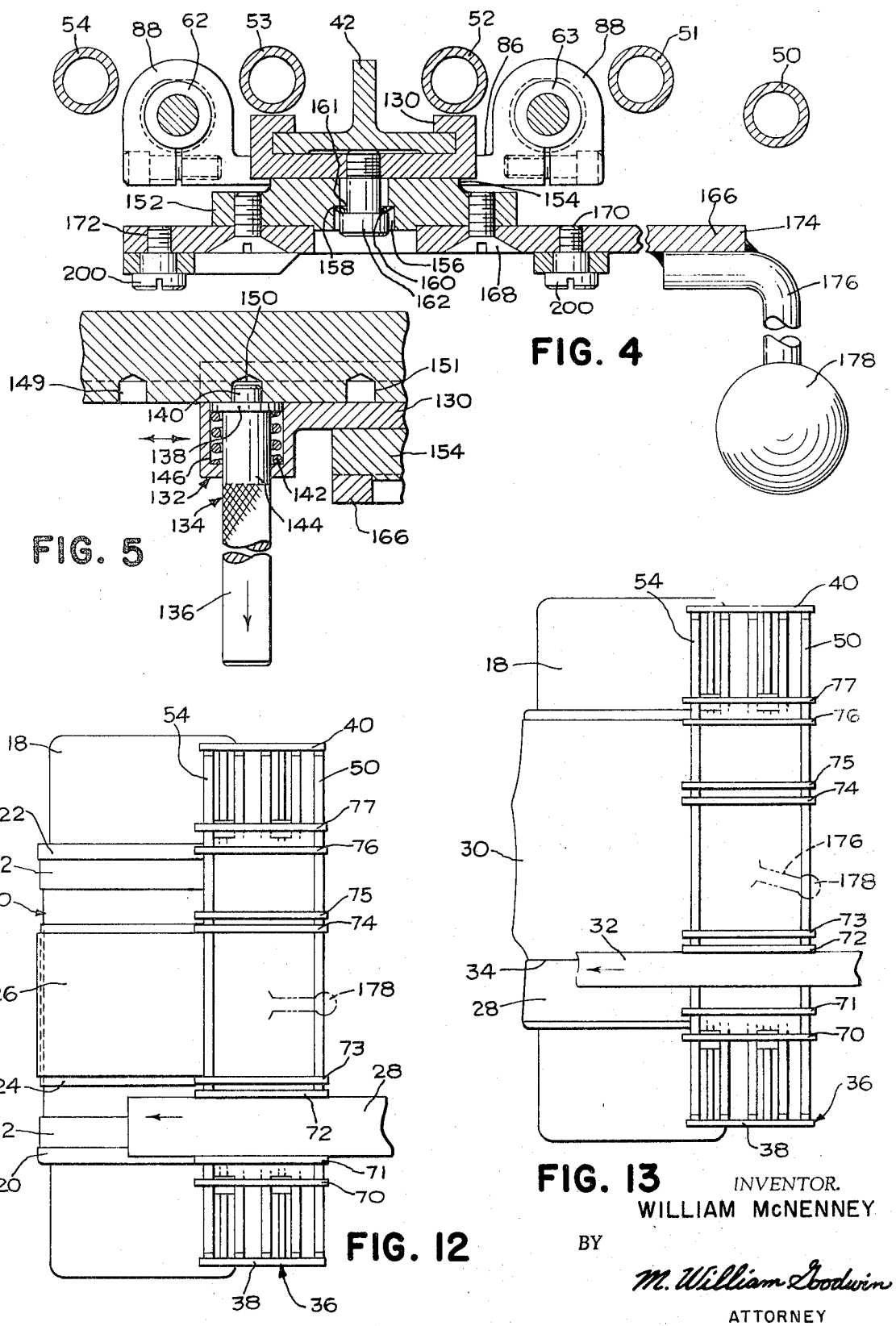

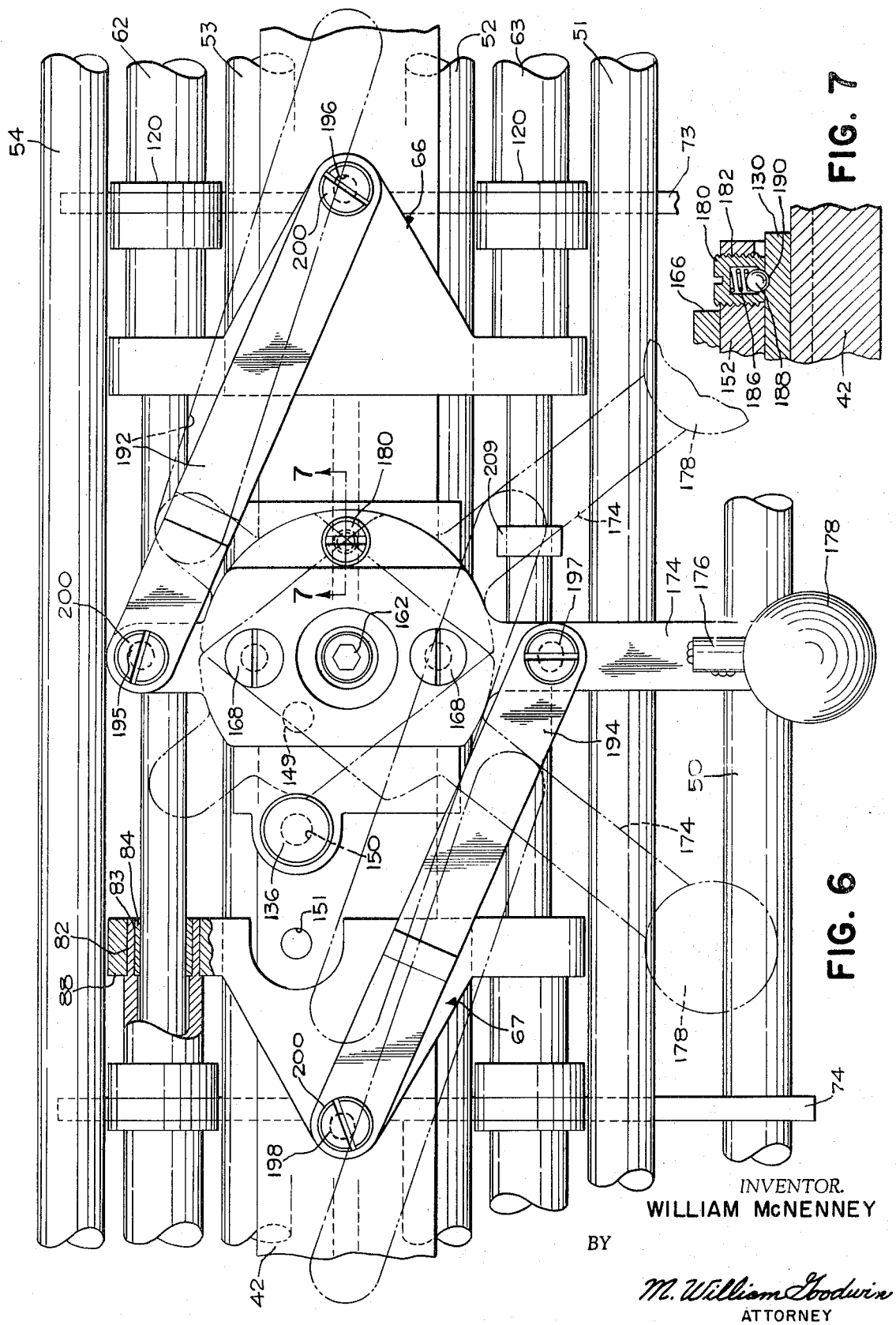

Sept. 15, 1970   W. McNENNEY   3,528,595
STRIP GUIDE FOR BUILDING PNEUMATIC TIRES
Filed Nov. 25, 1968   4 Sheets-Sheet 4

INVENTOR.
WILLIAM McNENNEY
BY
M. William Goodwin
ATTORNEY

United States Patent Office 3,528,595
Patented Sept. 15, 1970

3,528,595
STRIP GUIDE FOR BUILDING PNEUMATIC TIRES
William McNenney, Akron, Ohio, assignor to The Goodyear Tire & Rubber Company, Akron, Ohio, a corporation of Ohio
Filed Nov. 25, 1968, Ser. No. 778,432
Int. Cl. B65h 23/28
U.S. Cl. 226—199      10 Claims

ABSTRACT OF THE DISCLOSURE

An apparatus for guiding strips of material onto a rotating tire carcass. A plurality of parallel strip guides are adjustably mounted on a pair of slides so as to be movable toward and away from each other in a line parallel to the axis of the tire carcass. The pair of slides are also movable as a unit in the same direction as the guides.

---

The foregoing abstract is not to be taken as limiting the invention of this application, and in order to understand the full nature and extent of the technical disclosure of this application, reference must be made to the accompanying drawings and the following detailed description.

This invention relates to the building of pneumatic tires and more particularly to an apparatus for guiding strip elements onto a generally cylindrical, rotatable tire building drum.

In a known process for building pneumatic tires, a basic carcass comprising one or more reinforcing plies and a pair of bead rings is built on a cylindrical tire building drum. It is sometimes desirable to provide additional components to such a carcass in the form of strip material. These components may include such items as chafers, breakers, white sidewall strips or junction strips. These strips are generally applied circumferentially of and at various locations along the carcass. The width of the strips may vary widely, and it may be desirable to position them at different locations on different tires. Also, some strips may overlap others, a narrow strip may centrally overlie a wider strip, or overlying strips of equal width may be slightly offset laterally with respect to each other. In each case, however, it is desirable to guide each strip to a precise location on the carcass.

It is an object of this invention to provide novel and improved guide means for guiding strips of material onto a tire building drum. It is a further object of this invention to provide such a guide means capable of guiding overlapping or centrally overlying strips of material to substantially any position on the tire building drum.

The invention accordingly consists in the features of construction, combination of elements and arrangements of parts which will be exemplified in the construction hereafter set forth and the scope of the application of which will be indicated in the appended claims.

In the drawings:

FIG. 1 is a top view of an apparatus constructed in accordance with this invention;

FIG. 2 is an enlarged, fragmentary elevational view of a portion of the apparatus of FIG. 1 taken substantially along line 2—2 of FIG. 1;

FIG. 3 is a sectional view of the apparatus of FIG. 2 taken substantially along line 3—3 of FIG. 2;

FIG. 4 is an enlarged sectional view of the apparatus of FIG. 1 taken substantially along line 4—4 of FIG. 1;

FIG. 5 is an enlarged sectional view of a portion of the apparatus of FIG. 1 taken substantially along line 5—5 of FIG. 1;

FIG. 6 is a bottom view of a portion of the apparatus of FIG. 1;

FIG. 7 is a fragmentary view taken substantially along line 7—7 of FIG. 6;

FIGS. 10–13 are top views of the apparatus of FIG. 8 similar to FIG. 9, but with elements of the apparatus in different operative positions.

Figure 8:
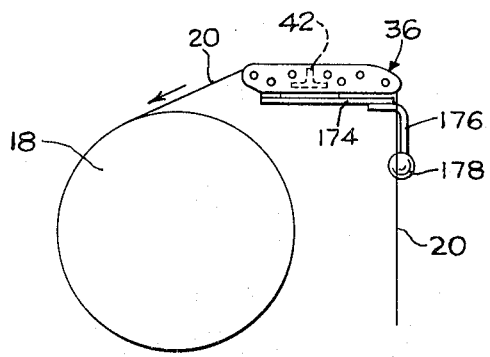
FIG. 8 is a side elevational view of an apparatus constructed in accordance with this invention shown in conjunction with a tire building drum.
Figure 9:
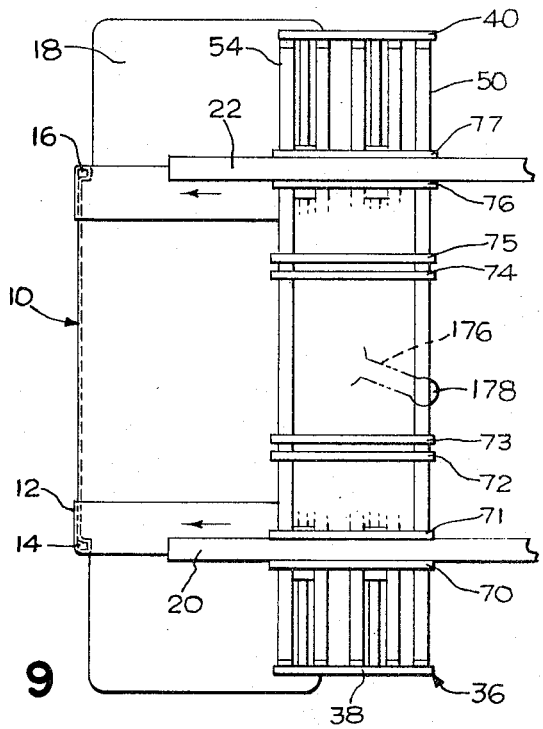
FIG. 9 is a top view of the apparatus of FIG. 8.

With reference to the drawings and particularly FIG. 9 in a typical tire building operation, a basic tire carcass 10 comprising two or more reinforcing plies 12 and a pair of reinforcing beads 14 and 16 is built on a rotatable building drum 18.

Figure 10:
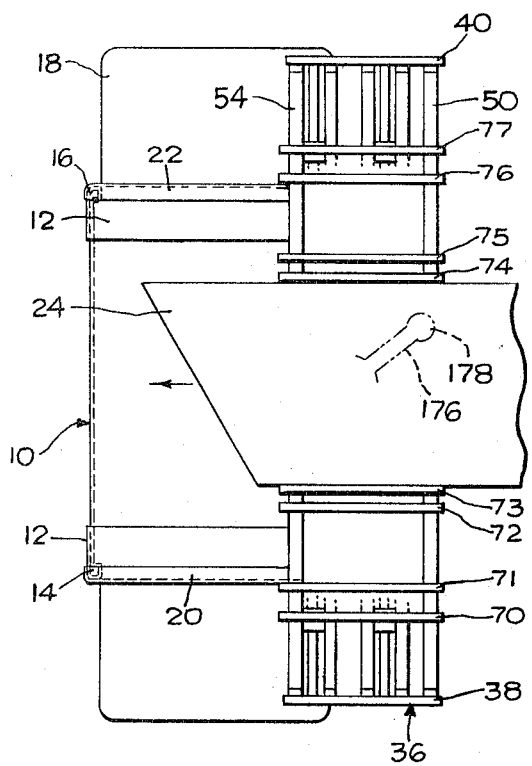
Figure 11:
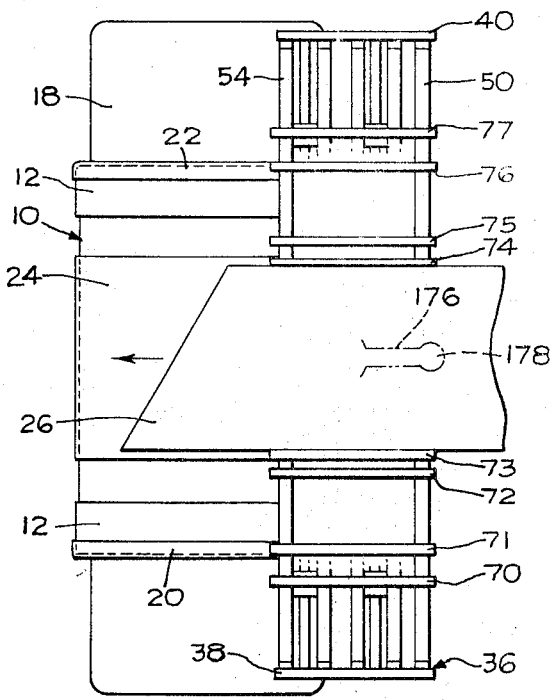

In addition to these components, and as shown in FIG. 9, it may be desirable to add chafer strips 20 and 22 which are applied over the areas of the beads 14 and 16 of the carcass 10. As shown in FIGS. 10 and 11, additional reinforcement may be added in the center area of the carcass 10 in the form of breaker strips 24 and 26. In the particular embodiment shown, the first breaker strip 24 is wider than the second breaker strip 26 and they are both centered with respect to the tire carcass 10. It should be noted, however, that they need not be centered with respect to the tire carcass 10, but could be alternately offset to one side and then the other. If a white sidewall tire is desired, a white sidewall strip 28 as shown in FIG. 12 is applied over the carcass 10 which may or may not overlap on the chafer 20. After the tread rubber 30 illustrated in FIG. 13 has been applied to the tire carcass 10, a junction or cover strip 32 may be applied over the seam 34 between the tread rubber 30 and the sidewall strip 28.

With particular reference to FIGS. 1 through 3, the apparatus of this invention comprises a frame 36 having a pair of parallel, generally flat elongated end plates 38 and 40 rigidly connected by a straight inverted T-bar 42. A pair of rods 44 and 46 extend between and are rigidly fixed to the end plates 38 and 40 by means of dowel pins 41. The rods 44 and 46 are parallel to the T-bar 42 and when viewed from above the apparatus, are located on opposite sides of the T-bar 42. The rods 44 and 46 are round and of uniform cross section over their entire length and have a flat surface 48 along the top.

A plurality of rollers 50, 51, 52, 53 and 54 are supported on the end plates 38 and 40 and disposed parallel to the T-bar 42. As illustrated in FIG. 3, the rollers are arranged such that their top surfaces 56 generate a smooth curve over which fabric strips 58 may move.

A pair of slides generally shown at 60 and 61 in FIG. 1 are spaced apart and slidably supported by the rods 44 and 46. The slide 60 comprises a pair of elongated tubular members 62 and 63 and a yoke 66 at its inner end, and has a plurality of guide elements 70, 71, 72 and 73 mounted thereon. The slide 61 is similar to the slide 60 and comprises a pair of elongated tubular members 64 and 65 and a yoke 67 at its inner end, and has a plurality of guide elements 74, 75, 76 and 77 mounted thereon.

As illustrated in FIGS. 3 and 6, each of the tubular members 62 through 65 has an inside diameter slightly larger than the diameter of the rods 44 and 46 and has a flat surface 80 on its outside surface extending for its entire length. One end of each tubular member 62 through 65 has a reduced diameter portion 82. Each end of each tubular member 62 through 65 has a counter bore 83 in which is received a bushing 84.

As best seen in FIGS. 4 and 6, the tubular members 62 and 63 are connected for simultaneous longitudinal movement by a yoke 66. The yoke 66 comprises a generally triangular shaped flat plate 86 on which are mounted a pair of split clamp rings 88. The reduced diameter ends of the tubular members 62 and 63 are received coaxially within the rings 88 and clamped tight.

The yoke 67 is similarly constructed and similarly connects the tubular members 64 and 65.

Each of the guide elements 70 through 77, best seen in FIGS. 1, 2 and 3, comprises a flat plate 110 with its top edge 112 being a curve similar to the curve defined by the top surfaces 56 of the rollers 50 through 54. The bottom portion of each guide element has cut out portions 113, 114, 115 and 116 to accommodate the rollers 51 through 54. A hole 118 is provided in each of the guide elements to accommodate the roll 50. A collar 120 is received in and extends through each of two holes 122 in each of the guide elements 70 through 77. Each collar 120 has a shoulder 124 on one end which abuts the side of the guide element when the collar 120 is inserted in the hole 122. A ring 126 is received over the protruding end 128 of the collar 120 and secured thereto. A set screw 131 is received in the threaded hole 132 which extends radially through the collar 120 and the ring 126.

Each guide element 70 through 77 is secured in its longitudinal position along the slide 60 or 61 by tightening the set screw 131 down on the flat surface 80 on their respective tubular members 62 and 63 or 63 and 64.

A support member or support 130 best seen in FIGS. 4, 5 and 6, is disposed about the horizontal legs of the T-bar 42 in sliding relationship therewith. The support 130 is generally C-shaped in cross section over its entire length and is located between the slides 60 and 61. A stop means 132, best seen in FIGS. 4 and 6, is located in a corner of the support 130 and comprises a round rod 134 with the lower end knurled to form a grip or handle 136. A shoulder 138 is provided near the upper end of the rod 134. The upper end of the rod 134 is reduced in diameter to form a pin 140. A coil spring 147 is disposed about the smooth portion 144 of the rod 134 adjacent to the shoulder 138. The rod 134 and spring 144 are received in the cylindrical hole 146 in the support 130 with the spring 142 compressed between the annular shoulder 148 and the shoulder 138.

A series of holes 149, 150 and 151, illustrated in FIGS. 1 and 6, is provided along one leg of the T-bar 42 in line with the line of motion of the pin 140 as the support 130 moves along the T-bar 42. The pin 140 can thus be successively urged into the holes 149, 150 and 151 by the spring 142. A generally flat circular pivot plate 152, best seen in FIG. 4, is disposed centrally of and below the support 130. The plate 152 has a concentric circular raised top portion 154 and a coaxial circular hole 156 through the center. The hole 156 is smaller in diameter at the top and has a shoulder 158 near the middle providing a seat for the dish type spring 160. A threaded screw or pivot pin 162 passes through a hole 161 in the center of the spring 160, and through the hole 152 and is threadably received in a hole 164 in the center of the support 130.

An elongated flat lever 166, illustrated in FIGS. 4 and 6, is secured to the pivot plate 152 by means of two countersunk screws 168. The lever 166 is provided with two threaded holes 170 and 172 spaced equidistant from and on opposite sides of the pivot pin or axis 162. One end 174 of the lever 166 is extended beyond the hole 172 and is provided with a bent down handle 176 leaving a spherical grip 178 on the end.

A detent 180, best seen in FIGS. 6 and 7, is threadably received in a hole 182 through the pivot plate 152. The detent 180 comprises a set screw 184 with a spring 186 loaded ball 188 which protrudes out the bottom of the set screw 184. A centering notch 190 is located in the bottom of the support 130 to receive the ball 188 when the lever 166 is perpendicular to the T-bar 42.

A pair of straight flat links 192 and 194 of equal length are provided with holes 195, 196 and 197, 198 respectively through their ends. The diameter of, and the center distance between, the holes 195 and 196 in the link 192 are the same as that for the holes 197 and 198 in the link 194. One end of the link 192 is pivotally connected to the yoke 66 and the other end pivotally connected to the hole 170 in the lever 166 by means of pivot pins 200. The other link 194 is similarly pivotally connected to the yoke 67 and the hole 172 in the lever 166.

A pair of ring-like stop means 208 and 209, best seen in FIG. 1, are received coaxially over the rod 44 and at the opposite ends respectively of the tubular member 63. Each stop means has a radial threaded hole 210 in which is received a set screw 212. The stop means 208 is movable along the rod 44 and can be fixed in any axial position along the rod 44 by tightening the set screw 212 down on the flat surface 48.

In adjusting the apparatus for operation the support 130 is fixed in a central position by pulling down on the handle 134, moving the support 130 to the center of the T-bar 42 and releasing the handle 134 allowing the pin 140 to be urged into the centering hole 150. The lever 166 is moved until the centering detent 180 drops into the centering hole 190.

The inner two guide elements 73 and 74 are then set for the narrow breaker 26 by sliding them along their respective tubular members 62 and 63 or 64 and 65 and tightening the set screws 131 when the guides are in the proper position.

The two guide elements 71 and 72, on the side of the carcass which is to receive the sidewall strip 28, are then set in the same manner while the centering detent 180 is still engaged in the centering hole 190.

The lever 166 is then rotated until the center guide elements 73 and 74 are far enough apart for the wide breaker 24. The lever 166 is held in this position while the out stop 208 is moved up to touch the tubular member 63 and tightened down on the rod 44 by means of the set screw 212.

The lever 166 is then turned back past the center until the guide element 71 is aligned with the proper position for the chafer strip 20. The in stop 209 is then moved up against the tubular member 63 and tightened down on the rod 44. The outside guide elements 70, 76 and 77 are then adjusted to guide the chafers 20 and 22 in the same manner as before.

In the operation of the apparatus, the lever 166 is moved clockwise until the tubular member 63 strikes the out stop 208. The wide breaker 24 is then applied to the carcass by rolling it over the rollers and through a guide channel formed by guide elements 73 and 74. The lever 166 is then turned back to the center detent position and the narrow breaker 26 is applied in the same manner. The lever 166 is then turned counter clockwise until the bushing 63 strikes the in stop 209 and the chafers 20 and 22 are applied by rolling them over the rolls and through the guide channels formed by the two outside pairs of guide elements 70, 71 and 76, 77. The lever 166 is then returned to the center detent position and the sidewall strip 28 is guided onto the carcass 10 through the guide channel formed by its previously adjusted guide elements 71 and 72.

If a junction or cover strip 32 is desired, the lever 166 is turned until the tubular member 63 strikes the in stop 209. The junction strip 32 is then guided over the rollers 50 to 54, next to the guide element 72 and onto the tire carcass 10.

It should be noted that the components of a tire carcass may vary but the adjustments available in the guide elements, the stops 208, 209 and support 130 offer much versatility. For example, it is possible to apply breaker strips of equal width and have them alternately offset to opposite sides of the carcass center line. This is done by setting the lever 166 on the center detent and the support 130 to the center hole 150. The inside guides 73 and 74 are adjusted to the width of the breaker strip to be used. The support 130 is then moved to the outside hole 151 which displaces both slides 60 and 62 as a unit to one side. The breaker can then be guided through the guide elements 73 and 74 to a position offset to the right of the center of the carcass. The slide 130 is then moved to the opposite outside hole 149 and the next breaker strip is then applied to a position on the carcass 10 offset to the other side of the center line. While in the specific embodiment the means for displacing the slides 60 and 61 as a unit and in the same direction involves movement of the lever 166 and associated linkages relative to the rods 44, 46, it will be apparent to those skilled in the art that the desired function could also be obtained by mounting the rods 44, 46, lever 166 and associated linkages for movement as a unit relative to the frame 36.

While certain representative embodiments and details have been shown for the purpose of illustrating the invention, it will be apparent to those skilled in the art that various changes and modifications may be made therein without departing from the invention.

What is claimed is:

1. Apparatus for guiding material onto a cylindrical tire carcass comprising a pair of slides, means mounting said slides for movement relative to and toward and away from each other, a guide element carried by each slide and cooperating with the guide element on the other slide to provide a guide channel for breakers and the like, an additional pair of guide elements carried by each of said slides and cooperaing to form a guide channel for a strip element, and means for moving said slides simultaneously and in opposite directions.

2. Apparatus as claimed in claim 1 further comprising stop means for locating said slides in at least 2 positions relative to each other corresponding to predetermined positions of the guide elements of said breaker guide channel and the strip element guide channels.

3. Apparatus as claimed in claim 2 in which the guide elements are mounted for selective adjustment relative to the respective associated slide and in direction corresponding to the directions of the movement of the slide.

4. Apparatus as claimed in claim 3 in which an additional guide element is carried by each slide for movement therewith and cooperates with one of the guide elements of said additional pair thereof to provide an additional channel for guiding an additional strip element, said additional guide element being mounted for adjustment relative to the slide and the other guide elements in directions corresponding to the directions of movement of the slide.

5. Apparatus as claimed in claim 4, said means for moving said slides comprising a lever disposed between said pair of slides and mounted for piovtal movement about an axis intermediate its ends, a pair of links, one end of the links being pivotally connected to said lever on opposite sides of and in equality spaced relation to the pivotal axis of said lever, the other ends of said links being pivotally connected to said slides.

6. An apparatus as claimed in claim 5, said stop means for locating said slides comprising means for locating said slides in a predetermined position, and a pair of positive stop means engageable with one of the slides to limit the maximum movement of said slides in opposite directions from said predetermined position.

7. Apparatus as claimed in claim 6, each of said slides comprising at least two rigidly connected tubular members slidably disposed respectively about parallel rods.

8. An apparatus as claimed in claim 7, said pair of positive stop means comprising a pair of rings disposed at the opposite ends of one of said tubular members and in the line of motion of said tubular member, and means mounting said rings on one of said rods for adjustment in the direction of the movement of said slides.

9. Apparatus as claimed in claim 1 and further including means for displacing at least said slides and said means for moving said slides as a unit in said directions of movement of said slides.

10. Apparatus as claimed in claim 4 and further including means for displacing at least said slides and said means for moving said slides as a unit in said directions of movement of said slides.

References Cited

UNITED STATES PATENTS

| | | | |
|---|---|---|---|
| 2,868,540 | 1/1959 | Herr | 226—199 |
| 3,170,829 | 2/1965 | Batten | 226—199 X |

ALLEN N. KNOWLES, Primary Examiner